United States Patent [19]
Kao et al.

[11] Patent Number: 5,757,966
[45] Date of Patent: May 26, 1998

[54] HIGH-SPEED ENCODER

[75] Inventors: Jean S. Kao, Cupertino; Sam S. Su, Rowland Heights; Danny T. Ong, San Gabriel, all of Calif.

[73] Assignee: Xerox Corporation, Stamford, Conn.

[21] Appl. No.: 502,840

[22] Filed: Jul. 11, 1995

[51] Int. Cl.⁶ .................................................. G06K 9/36
[52] U.S. Cl. .................... 382/232; 382/234; 371/37.8; 395/705; 395/706; 395/707
[58] Field of Search ............................. 382/232, 234; 395/706, 707, 705; 364/280; 371/37.8; 358/261.3, 261.4; 341/97

[56] References Cited

U.S. PATENT DOCUMENTS

| | | | |
|---|---|---|---|
| 4,473,902 | 9/1984 | Chen | 371/37.8 |
| 4,516,173 | 5/1985 | Abe et al. | 358/261.4 |
| 4,520,347 | 5/1985 | Campbell, Jr. | 341/97 |
| 4,656,582 | 4/1987 | Chaitin et al. | 395/707 |
| 4,807,043 | 2/1989 | Kaku et al. | 358/261.3 |
| 5,450,585 | 9/1995 | Johnson | 364/280 |
| 5,598,561 | 1/1997 | Funaki | 395/706 |
| 5,655,122 | 8/1997 | Wu | 395/705 |

FOREIGN PATENT DOCUMENTS 0 211 611  2/1987  European Pat. Off.  ....... H04N 1/411

*Primary Examiner*—Jose L. Couso
*Assistant Examiner*—Anh Hong Do
*Attorney, Agent, or Firm*—Fariba Rad

[57] ABSTRACT

An encoder for encoding four bits of uncompressed data in one clock cycle generates one code or in parallel a plurality of codes if the bits can be represented by a code or by a plurality of codes and keeps the bits that can not be represented by a code unaltered. On the following clock cycle, the unaltered bits from the previous clock cycle will be combined with a new set of four bits of data and the cumulative bits will be converted to a code if they can be represented by a code and if they can not be represented by a code, they will be stored until the next clock cycle. The process of storing the cumulative number of bits will be continued until the cumulative number of bits can be represented by a code.

14 Claims, 14 Drawing Sheets

FIG. 5

| 0 | 0 | 1 | 1 | 1 | 0 | 1 | 1 |
|---|---|---|---|---|---|---|---|
| 0 | 0 | 0 | 1 | 1 |   |   |   |

| 1 | 1 | 1 | 0 | 0 | 1 | 0 | 1 |
|---|---|---|---|---|---|---|---|
| 1 | 1 | 0 | 0 | 0 |   |   |   |

$c_0$ ↑
   $a_0$

⇒

| 0 | 0 | 0 | 1 | 1 | 0 | 1 | 0 |
|---|---|---|---|---|---|---|---|
| 0 | 0 | 1 | 1 | 1 |   |   |   |

INVERTED

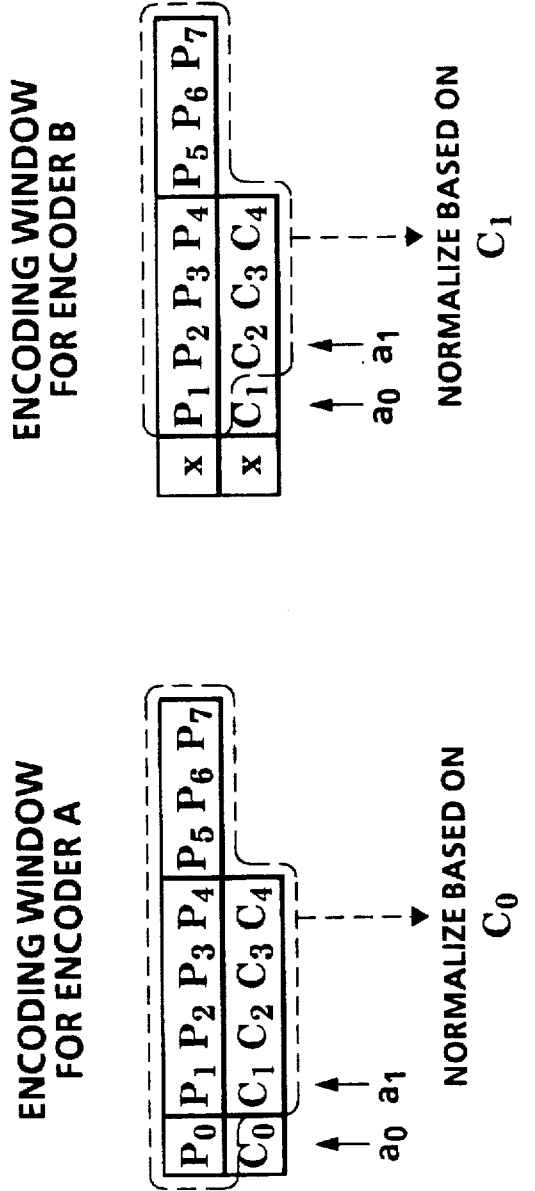

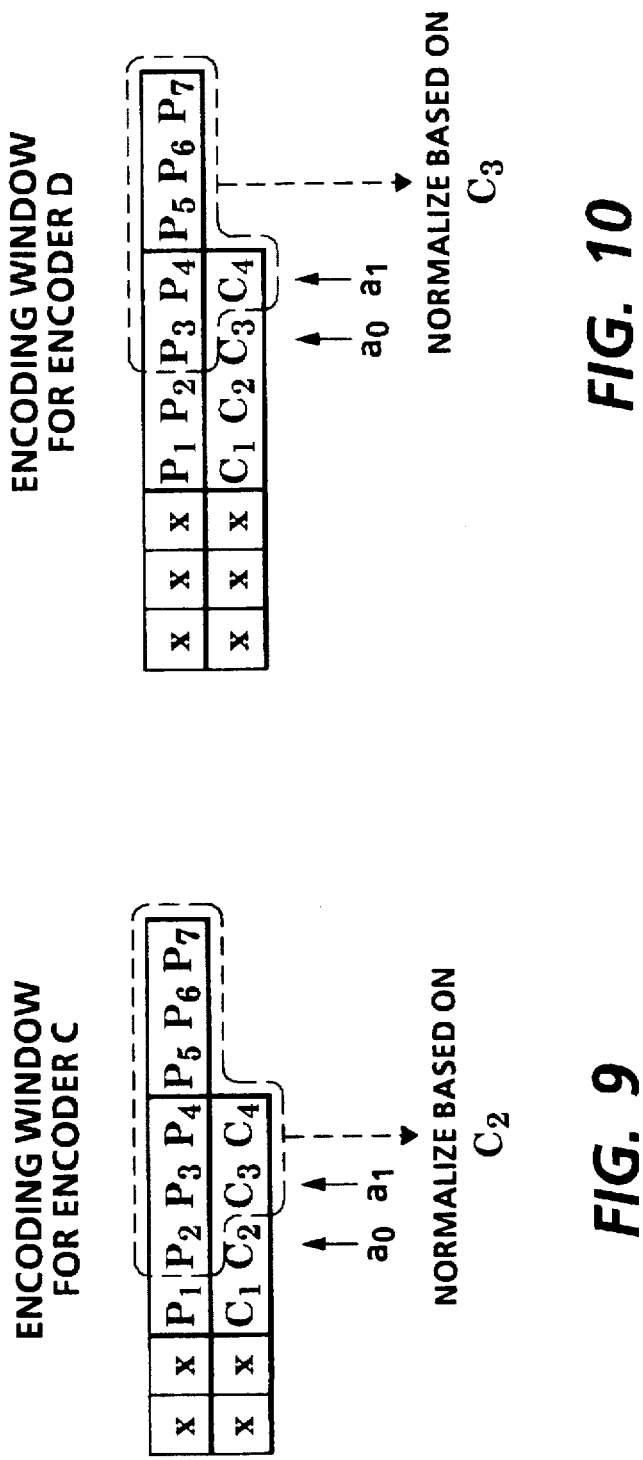

FIG. 11
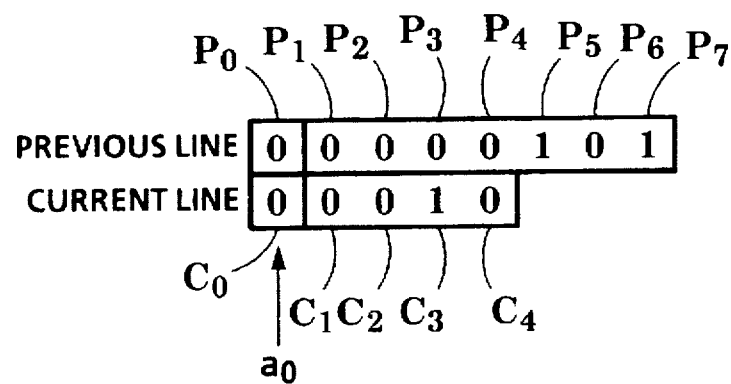
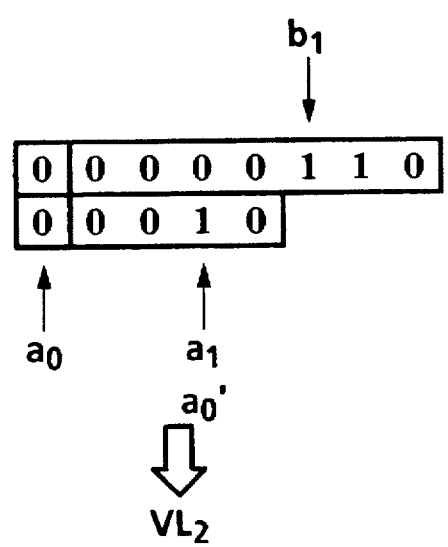
FIG. 12

FIG. 16

|      | ENCODER A | ENCODER B | ENCODER C | ENCODER D |
|------|-----------|-----------|-----------|-----------|
| (1)  | 0         |           |           |           |
| (2)  | 4         |           |           |           |
| (3)  | 3         |           |           | 0         |
| (4)  | 3         |           |           | 1         |
| (5)  | 2         |           | 0         |           |
| (6)  | 2         |           | 2         |           |
| (7)  | 2         |           | 1         | 0         |
| (8)  | 2         |           | 1         | 1         |
| (9)  | 1         | 0         |           |           |
| (10) | 1         | 3         |           |           |
| (11) | 1         | 2         |           | 0         |
| (12) | 1         | 2         |           | 1         |
| (13) | 1         | 1         | 0         |           |
| (14) | 1         | 1         | 2         |           |
| (15) | 1         | 1         | 1         | 0         |
| (16) | 1         | 1         | 1         | 1         |

0 = No code is found.

FIG. 18

|     | $C_1$ | $C_2$ | $C_3$ | $C_4$ | deltaH |
|-----|-------|-------|-------|-------|--------|
| (1) | C     | X     | X     | X     | 1      |
| (2) | N     | C     | X     | X     | 2      |
| (3) | N     | N     | C     | X     | 3      |
| (4) | N     | N     | N     | C     | 4      |
| (5) | N     | N     | N     | N     | 4      | ns of the page

HIGH-SPEED ENCODER

BACKGROUND OF THE INVENTION

With a growing need for faster facsimiles and faster printers, the need for faster encoders (compressors) is also growing. Typically, to transmit data electronically from one point to another, an encoder is used to compress the data prior to transmission in order to transmit less amount of data. One of the factors in transmitting the data faster is to speed up the encoder. Based on the CCITT, IBMMR and TIFF compression algorithms, the encoder, which receives the data serially, has to identify the change of color on the current line and with respect to the change of color of the previous line encode (compress) the current line data.

Usually, the codes, which represent the frequent color changes on the document, slow down the decoder. In any of the above compression algorithms, a changer of color encodes one code. Potentially, the change of color can occur in two consecutive bits. A sequence of these frequent change of color will result in worst case performance, which will slow down the encoding process. This effect slows down the flow of data to the transmission system.

To overcome the above problem, there is a great need for an encoder capable of encoding several bits of data in parallel. Encoding more than one bit data at each clock cycle where there is a frequent change of color complicates the encoding process.

It is an object of this invention to encode at least four bits of data at each clock cycle.

SUMMARY OF THE INVENTION

According to the present invention, there is disclosed an encoder which is capable of taking four bits of uncompressed data and encoding the received data by generating an intermediate code for each color change either one code if the four bits can be represented by one intermediate code or in parallel generating a plurality of intermediate codes if the four bits can be represented by a plurality of intermediate codes and keeping the bits that can not be represented by an intermediate code unaltered.

In the same clock cycle, a first code generator receives the one intermediate code if the received bits of uncompressed data can be represented by one intermediate code and converts it into one code or receives the plurality of intermediate codes if the received bits can be represented by a plurality of codes and converts them each into a code.

It should be noted that hereinafter "code" shall mean either "a CCITT code, an IBMMR code or a TIFF code".

In the same clock cycle, a second code generator receives the unaltered bits of uncompressed data if they can not be represented by an intermediate code and stores them.

At each clock cycle the second code generator adds the stored number of bits from a previous clock cycle to an unaltered number of bits of uncompressed data of the current clock cycle and stores the cumulative number of bits if the cumulative number of bits can not be represented by a code and repeating the storing process within each clock cycle until the stored number of bits from a previous clock cycle along with the unaltered number of bits of uncompressed data of the current clock cycle can be represented by a code.

Within a clock cycle in which the stored number of bits from a previous clock cycle along with the unaltered number of bits of uncompressed data of the current clock cycle can be represented by a code, the second code generator converts the cumulative number of bits into a horizontal code, if the cumulative number of bits can be represented by a horizontal code and discards them if the cumulative number of bits can be represented by a pass code or a vertical code.

Finally, the first code generator generates a pass code or a vertical code if the cumulative number of bits can be represented by a pass code or a vertical code.

BRIEF DESCRIPTION OF THE DRAWINGS

FIG. 5 shows bits of data in an encoding window with respect to the starting position of that encoding window;

FIG. 6 shows an encoding window in which the starting position is black and also shows the same window after it has been normalized;

FIG. 7 shows the encoding window for the encoder A and its starting position;

FIG. 8 shows the encoding window for the encoder B and its starting position;

FIG. 9 shows the encoding window for the encoder C and its starting position;

FIG. 10 shows the encoding window for the encoder D and its starting position;

FIG. 11 shows the data in an encoding window which will be used by encoders A, B, C and D to be encoded in parallel;

FIG. 12 shows the color changes of the encoding window for encoder A;

FIG. 16 shows 16 different conditions that can occur between the encoders;

FIG. 18 shows five different conditions on the following bits of a long code along with deltaH for each condition;

DESCRIPTION OF THE PREFERRED EMBODIMENT

In this invention, the speed of encoding is increased by designing the encoder to process four bits of data at each clock cycle. To achieve this performance, at each clock cycle, four bits of data are taken by the encoder and they are converted into a code or multiple codes depending on the color changes of the four bits. In the case, that each bit has a color change, the encoder of this invention is capable of converting each bit into one code and as a result send out four codes for the received four bits. The process of receiving four bits and converting them into one to four codes and sending them out is performed in one clock cycle.

The encoder of this invention utilizes four parallel encoders to produce one to four codes in one clock cycle.

Figure 1:
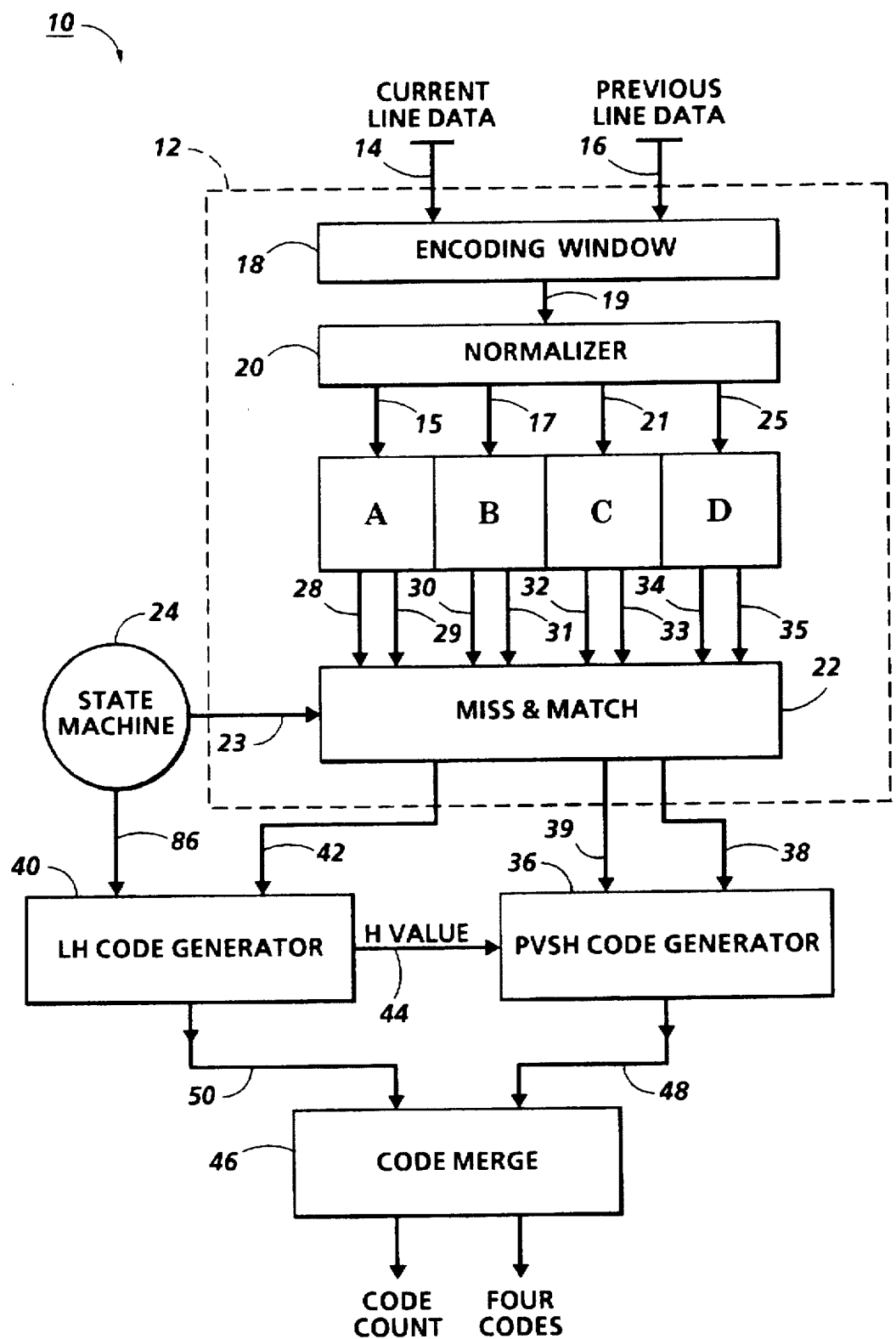
FIG. 1 shows a block diagram of the encoder of this invention.

Referring to FIG. 1, there is shown a block diagram of an encoder 10 of this invention. Intermediate block 12 of the encoder 10 receives a current line data through bus 14 and previous line data through bus 16. The intermediate block 12 contains an encoding window 18, a normalizer block 20, four encoders A, B, C and D, a miss and match block 22 and a state machine 24.

The encoding window 18 ensures that all the data needed for encoding 4 bits of data is available to the encoder 10. Encoding window 18 sends the current line data and the previous line data to the normalizer block via line 19.

Normalizer block 20 is utilized to invert the data both on the current line and on the previous line if the starting position is at a black data. By inverting the data, the normalizer block 20 ensures that the encoders A, B, C and D always references to a white data. This approach simplifies the encoding process since the encoders A, B, C and D need to identify only the change of color based on one reference color (white). Normalizer block 20 normalizes the data for each encoder separately based on the color of the starting position of each encoder and sends the normalized data to each of four parallel encoders A, B, C individually via lines 15, 17, 21 and 23 respectively.

The parallel encoders A, B, C and D each independently encodes the received data assuming a different starting position. Each one of the encoders A, B, C and D generate an intermediate code. Intermediate codes are generated to simplify the process of parallel encoding. Each intermediate code has a fixed length of 5 bits. Each block of FIG. 1 will be described in a greater detail hereinafter.

The outputs of each one of encoders A, B, C and D will be sent to miss and match block 22 via lines (28 & 29), (30 & 31), (32 & 33) and (34 & 35) respectively. Depending on the number of bits encoded by the encoder A, B, C and D the miss and match block 22 will select one to four intermediate codes to be sent out in order to ensure four bits of data are being encoded at each clock cycle.

The output of the miss and match block 22 could be one intermediate code $icode_1$, two intermediate codes $icode_1$ and $icode_2$, three intermediate codes $icode_1$, $icode_2$ and $icode_3$ or four intermediate codes $icode_1$, $icode_2$, $icode_3$ and $icode_4$.

The miss and match block 22 selects only the intermediate code A or the intermediate code A along with a combination from the intermediate codes B, C and D. The miss and match block 22 sends the selected intermediate code or codes and the information about the color of each code to code generator 36 via lines 38 and 39 respectively. In parallel, code generator 36 converts $icode_1$, $icode_2$, $icode_3$ and $icode_4$ each into a code.

It should be noted that for the purpose of simplicity, in FIG. 1, there is shown only one line 38 which delivers the intermediate codes to the PVSH code generator 36 and only one line 39 which delivers the color of different intermediate codes to PVSH code generator 36. However, in the actual implementation of disclosed embodiment of this invention each intermediate code and its color is sent to the PVSH code generator 36 individually.

At each clock cycle, if any one of the encoders A, B, C and D does not find a color change, it means that the end of that code is in one of the following clock cycles. In the same clock cycle, the unencoded bits (INTH) will be sent to the LH code generator 40 via line 42 to be stored till the next clock cycle. The end of a code might be found after many clock cycles. In the mean time, the LH code generator 40 adds the number of bits in each clock cycle to the stored number of bits from the previous clock cycle and stores the cumulative number of bits until the end of a code is found. Once the end of a code is found, depending on if the cumulative number of bits can be represented by a code, the LH code generator 40 will convert the cumulative number of bits into a long horizontal code and if they can be represented by a pass code, vertical code or a short horizontal code, the PVSH will generate a code.

It should be noted that a long horizontal code is defined as a code which represents more than four bits of uncompressed data and a short horizontal code is a code which represents a four or less bits of uncompressed data.

State machine 24 ensures the encoding states on each clock cycle is transferred into the following cycle and it controls the miss and match block 22 via line 23 and the LH code generator 40 via line 86.

The result from the PVSH code generator 36 will be sent to the code merge 46 via line 48 and the result from the LH code generator 40 will be sent to code merge 46 via line 50. The code merge 46 will concatenate the result from the PVSH code generator 36 and send them out. Concatenating the result from the PVSH code generator ensures that four bits of data has been encoded at each clock cycle.

Figure 2:
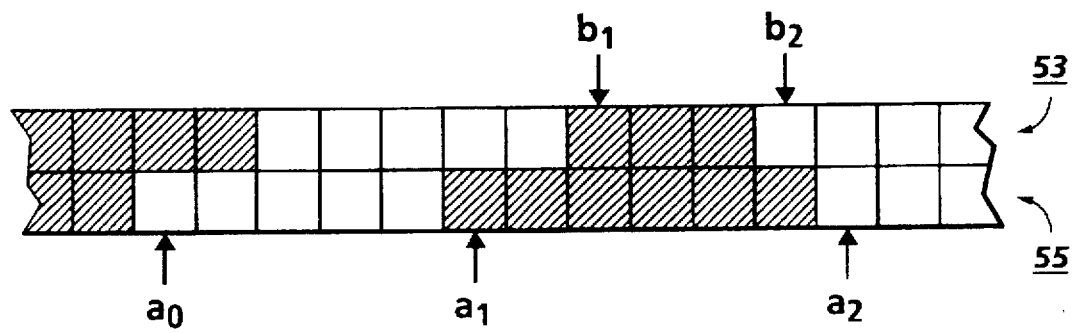
FIG. 2 shows an example of a portion of previous line data and a corresponding portion of current line data.

In order to comprehend the encoder of this invention, it is necessary to study the conventions used in CCITT algorithm. Referring to FIG. 2, there is shown a portion of previous line data 53 and a corresponding portion of current line data 55. On the current line 55, $a_0$ represents the starting position. At the start of a line, $a_0$ is set on an imaginary white position situated just before the first element on the line. During coding of the current line 55, the position of $a_0$ is defined by the previous coding mode. On the current line 55, $a_1$ represents the next change of color to the right of $a_0$. Also, on the current line 55, $a_2$ represents the next change of color to the right of $a_1$. On the previous line 53, $b_1$ represents the first change of color to the right of $a_0$ and of opposite color to $a_0$. Also, on the previous line, $b_2$ represents the next change of color to the right of $b_1$.

Figure 3:
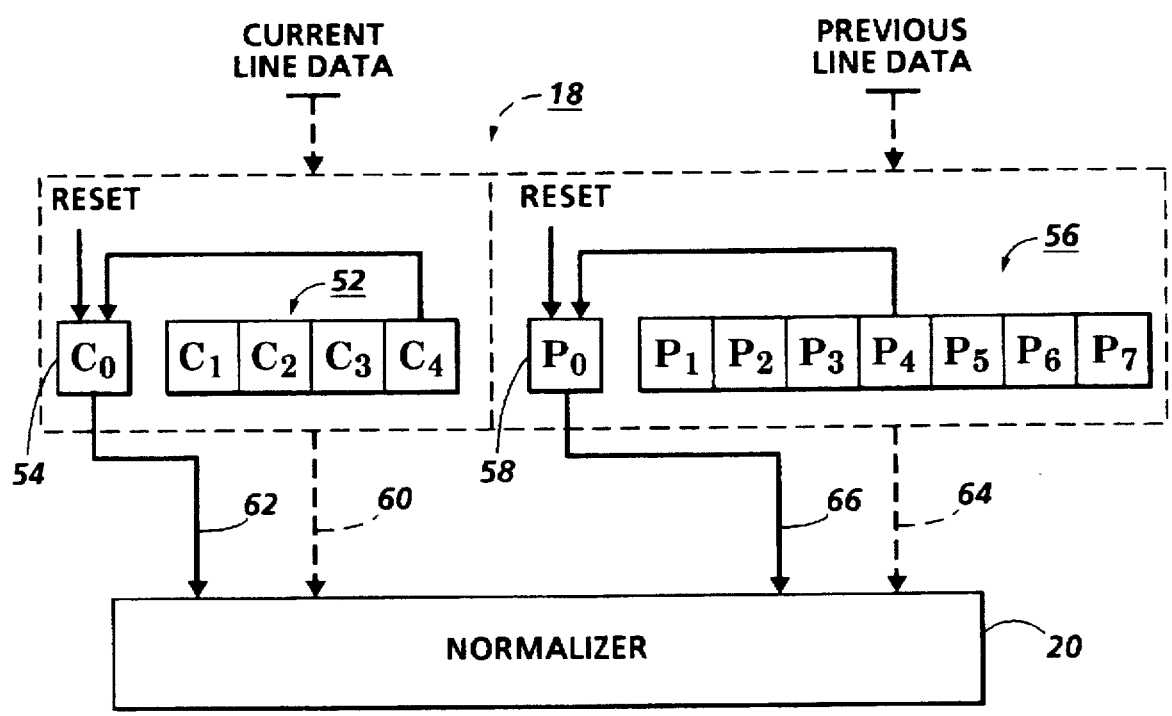
FIG. 3 shows a detailed block diagram of the encoding window of FIG. 1 along with the normalizer block of FIG. 1.

Referring to FIG. 3, there is shown a detailed block diagram of the encoding window 18 of FIG. 1 along with the normalizer block 20 of FIG. 1. Encoding window 18 is the interface between the encoder 10 (FIG. 1) and the elements outside of the encoder 10. In the Encoding window 18, there are four registers 52, 54, 56 and 58. At each clock cycle, register 52 receives four consecutive bits $C_1$, $C_2$, $C_3$ and $C_4$ of current line data. The four bits received at each clock cycle is the following four bits of the bits from the previous clock cycle. Register 54 holds one bit which indicates the $a_0$ bit and it is denoted as $C_0$. At the start of the scan line, register 54 is reset to zero to depict a white data. Register 56 receives seven consecutive bits $P_1$, $P_2$, $P_3$, $P_4$, $P_5$, $P_6$ and $P_7$ of previous line data at each clock cycle. The seven bits received at each clock cycle is the following seven bits of the bits from the previous clock cycle. Register 58 holds one bit which indicates $P_0$. $P_0$ is the bit which has the same position as $a_0$ (right above $a_0$) on the previous line.

The $C_0$ and $P_0$ are reset to zero at the beginning of a scan line because at the start of the current line, $a_0$ is an imaginary position which is one position before the first bit under encoding ($C_1$) and is regarded as a white bit.

Figure 4:
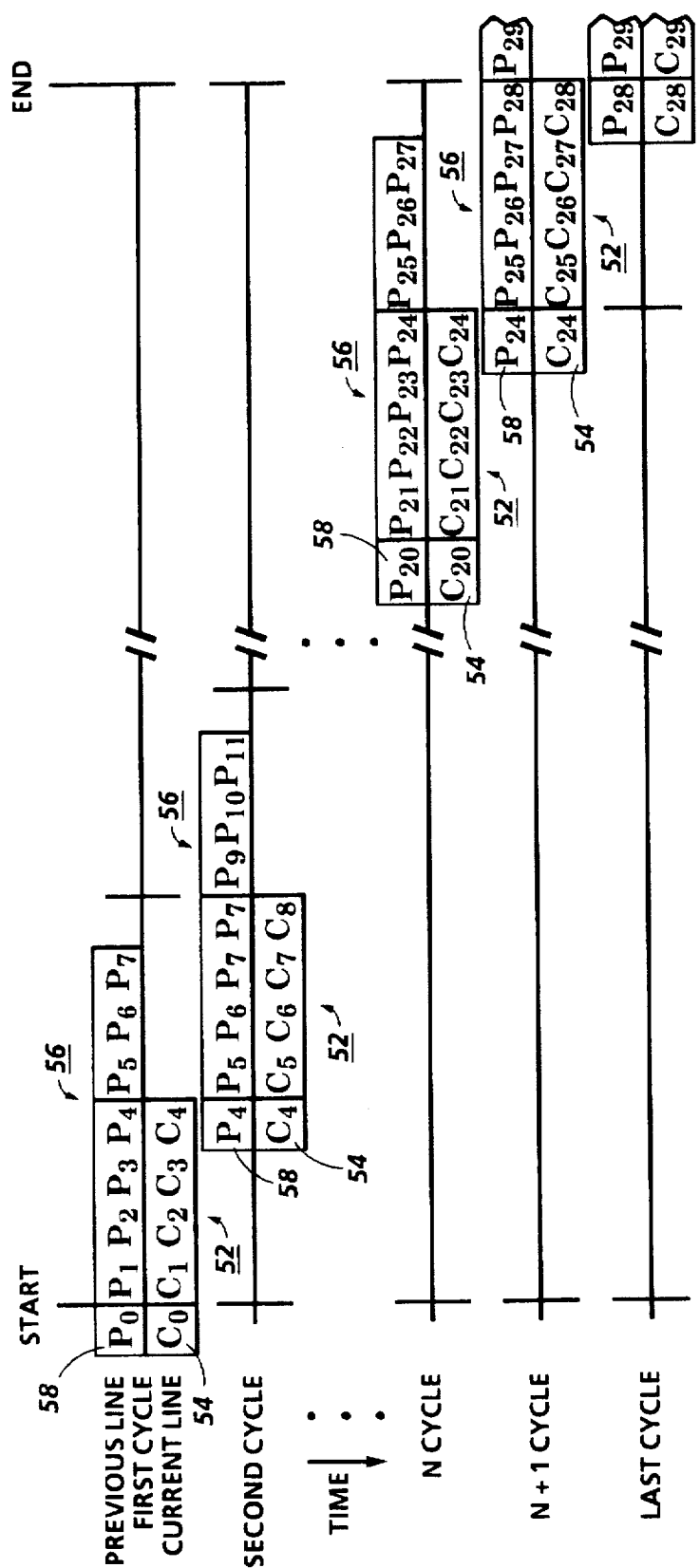
FIG. 4 shows how the registers in the encoding window receive their data from the current line and the previous line at each clock cycle.

Referring to FIG. 4, there is shown how the registers 52, 54, 56 and 58 receive their data from the current line and the previous line at each clock cycle. As it can be observed, after the first clock cycle the window moves forward by four bits. At the second clock cycle, the content of $C_4$ will be loaded into register 54 and the content of $P_4$ will be load into register 58. In the mean time, register 52 receives the next 4 bits and register 56 receives the next 7 bits. This process repeats on each clock cycle. For example, on the nth clock cycle, again the content of $C_{24}$ will be loaded into register 54 and the content of $P_{24}$ will be load into register 58. In the mean time, register 52 receives the next 4 bits and register 56 receives the next 7 bits. In the same manner the rest of the data from both previous line and current line will be loaded into the registers 52, 54, 56 and 58. When the encoding reaches the end of the scan line, a change of color is placed after the last bit $C_{28}$ of the scan line, in order to terminate the last code of the scan line.

It should be noted that for the purpose of simplicity, in FIG. 4, there are 28 ($C_1$–$C_{28}$) bits on a scan line. However, an actual scan line has a greater number of bits.

Referring back to FIG. 3, the encoding window 18 sends out the 4 bits of current line data via line 60 and one bit representing $a_0$ via line 62 to the normalizer block 20. Also, the encoding window 18 sends out the 7 bits of previous line data via line 64 and one bit $P_0$ representing a bit on the previous line data above the $a_0$ via line 66 to the normalizer block 20.

The reason for having 5 bits of current line data and 8 bits of previous line data is that 4 bits on the current line is needed to be encoded. Encoder A assumes the position of $a_0$ to be one position before the first bit ($C_1$) under encoding. The four bits under encoding are $C_1$, $C_2$, $C_3$ and $C_4$ and $C_0$ is the reference bit for encoding the bits $C_1$, $C_2$, $C_3$ and $C_4$. The change of color on $C_1$, $C_2$, $C_3$ and $C_4$ with respect to $C_0$ is the enabling factor in the encoding process. Therefore, register 54 holds the $C_0$ ($a_0$) and register 52 holds the four bits $C_1$, $C_2$, $C_3$ and $C_4$ under encoding. On the previous line all the bits above $C_0$, $C_1$, $C_2$, $C_3$ and $C_4$ are needed. In addition, three more bits are needed to determine if the last bit of the four bits on the current line is a vertical code. Therefore, register 58 holds $P_0$ and register 56 holds $P_1$, $P_2$, $P_3$, $P_4$, $P_5$, $P_6$ and $P_7$.

The normalizer block 20 has to normalize the data based on the color of $a_0$. Referring to FIG. 5, if the content of $a_0$ is 0 (white) the data will be kept the same. However, referring to FIG. 6, if the content of $a_0$ is 1 (black) the data for both the current line and the previous line will be inverted. The reason for inventing the data is to have one look up table for the codes.

Typically, white color data has one look up table and black color data has a different look up table. The look up table for the white data contains a data which is the inverse of the data in the look up table for the black data. Therefore, if the black data is converted to the white data or the white data is converted into black data, then only one look up table will be required. Therefore, normalizing reduces the need for two tables into one table. In this invention, only one table containing the white data is used.

It should be noted that the normalizing has to be done individually for each encoder. Referring to FIGS. 7–10, the starting position for encoder A is at $C_0$ which is the starting position for encoder A (FIG. 7). The data for encoder A should be normalized with respect to $C_0$. The starting position for encoder B is at $C_1$ (FIG. 8) and the data should be normalized with respect to $C_1$. The starting position for encoder C is at $C_2$ (FIG. 9) and the data should be normalized with respect to $C_2$. The starting position for encoder D is at $C_3$ (FIG. 10) and the data should be normalized with respect to $C_3$.

It should be noted that throughout this specification of this embodiment, every time notations $C_0$, $C_1$, $C_2$, $C_3$, $C_4$, $P_0$, $P_1$, $P_2$, $P_3$, $P_4$, $P_5$, $P_6$ and $P_7$ are used, FIG. 7 can be used to identify the position of each notation.

Referring back to FIG. 1, after the data is normalized for each encoder, the normalized previous line data and the normalized current line data will be sent to each of four encoders A, B, C, D via lines 28, 30, 32 and 34 respectively.

Each one of the encoders A, B, C and D is a look up table. The encoders A, B, C and D assign a global intermediate format of 10000 to the pass codes and a 00XXX intermediate format to the vertical codes in which the three least significant bits (XXX) represent the position of $a_1$ with respect to $b_1$. For example, XXX=111 represent $V_{L3}$ which means that $a_1$ is located 3 bits to the left of $b_1$. Each one of the encoders also assigns a 010XX intermediate format to the leading code of a short horizontal code and 011XX intermediate format to the trailing code of a short horizontal code. The two least significant bits of a leading code (XX) of a short horizontal code represent the relative distance between $a_0$ and $a_1$ and the two least significant bits of a trailing code (XX) of a short horizontal code represent the relative distance between $a_1$ and $a_2$. The encoders assign a dummy intermediate format of 11111 to a code that its end has not been found in order to notify the miss and match block 22 that a code has not been generated.

It should be noted that in a horizontal code, a leading code is $a_0a_1$ (the distance between $a_0$ and $a_1$) and a trailing code is $a_1a_2$ (the distance between $a_1$ and $a_2$). It should also be noted that each one of the leading code or the trailing code can have either have one portion called terminating code or two portions called terminating code and makeup code. Having just a terminating code or a terminating code along with a makeup code depends on the number of the bits being represented by the leading code or the trailing code. If the number of bits being represented by either a leading code or a trailing code is less than or equal to 63 bits, then only a terminating code will be sent out. However, if the number of bits being represented by either a leading code or a trailing code is more than 63 bits, then a terminating code and a makeup code will be sent out.

Referring to FIGS. 7, 8, 9 and 10 there are shown encoding window and position of $a_0$ on each encoder. Referring to FIG. 7, the encoder A has $a_0$ at $C_0$ position and needs all 13 bits to encode. Referring to FIG. 8, encoder B has $a_0$ at $C_1$ position and needs 11 bits to encode. Encoder B is to make up for the condition when encoder A encodes only one bit. Referring to FIG. 9, encoder C has its $a_0$ at $C_2$ position and needs 9 bits. Encoder C is to make up for the condition when either encoder A encodes only two bits or both encoder A and encoder B encode only one bit. Referring to FIG. 10, encoder D has its $a_0$ at $C_3$ position and needs only 7 bits. Encoder D is to make up for the condition when encoder A, encoder A and B or encoder A, B and C encode three bits.

It should be noted that the encoder A uses 8 bits of previous line data and five bits of current line data (FIG. 7). However, encoder B uses 7 bits of previous line data and 4 bits of current line data (FIG. 8), encoder C uses 6 bits of previous line data (FIG. 9) and 3 bits of current line data and encoder D uses 5 bits of previous line data and 2 bits of current line data (FIG. 10).

It should be noted each encoder, along with the intermediate code, will send out the color of its starting position. The color of the starting position determines the color of that intermediate code. Therefore, referring back to FIG. 1, colorA, colorB, colorC and colorD are sent to the miss and match block via lines 29, 31, 33 and 35.

FIGS. 11, 12, 13, 14 and 15 show an example of parallel encoding. It should be noted that for the purpose of simplicity, the positions $C_0$–$C_4$ and $P_0$–$P_7$ are only shown in FIG. 11. However, it should also be noted that the positions $C_0$–$C_4$ and $P_0$–$P_7$ in FIG. 12–15 are the same as the positions $C_0$–$C_4$ and $P_0$–$P_7$ of FIG. 1 1. As it can be observed, since the encoding window (FIG. 11) is at the start of the scan line, $a_0$ is reset to 0 which depicts a white data. With the encoding window of FIG. 11, encoder A finds a color change (as shown in FIG. 12) on the current line data on bit $C_3$ and a color change on the previous line on $P_5$. Since $b_1$ on the previous line is on $P_5$, the code is a vertical code ($V_{L2}$). Since the color change is on $C_3$, the encoder A has encoded three bits. While encoder A is encoding the data from encoding window of FIG. 11, encoders B, C and D are also encoding the data from the encoder window of FIG. 11.

Figure 13:
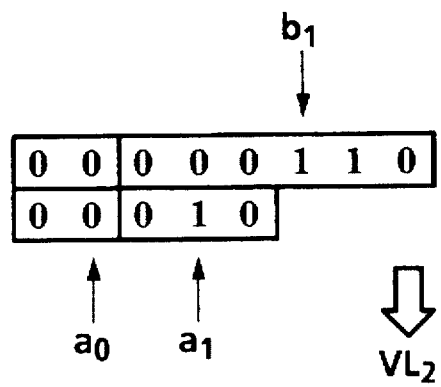
FIG. 13 shows the color changes of the encoding window for encoder B.

Referring to FIG. 13, encoder B encodes the data from the encoding window of FIG. 11 by placing $a_0$ on $C_1$. Encoder B, finds a color change on the current line data on bit $C_3$ and a color change on the previous line on $P_5$. Since $b_1$ on the previous line is on $P_5$, the code is a vertical code ($V_{L2}$).

Figure 14:
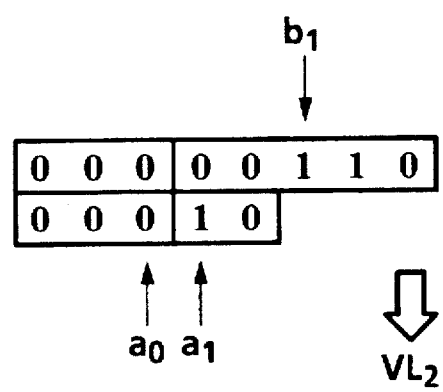
FIG. 14 shows the color changes of the encoding window for encoder C.

Referring to FIG. 14, encoder C encodes the data from the encoding window of FIG. 11 by placing $a_0$ on $C_2$. Encoder C, finds a color change on the current line data on bit $C_3$ and a color change on the previous line on $P_5$. Since $b_1$ on the previous line is on $P_5$, the code is a vertical code ($V_{L2}$).

Figure 15:
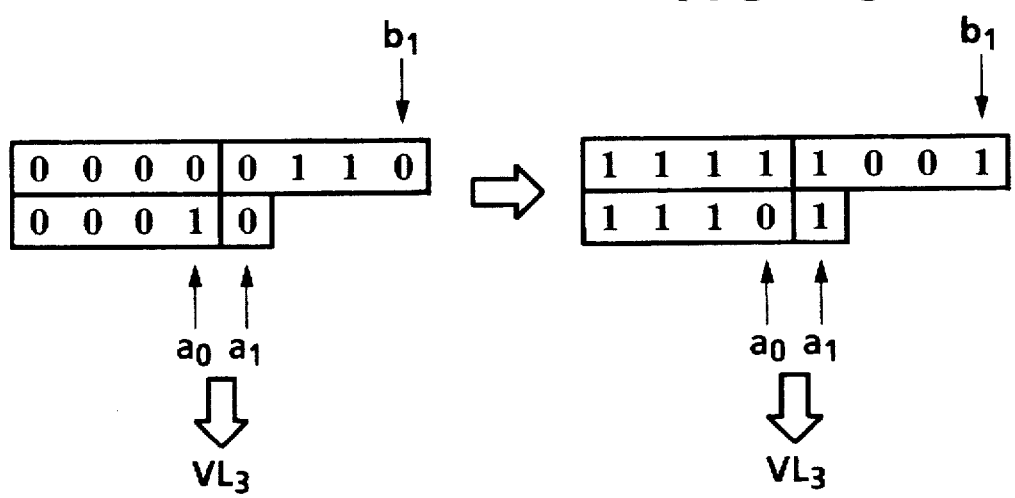
FIG. 15 shows the color changes of the encoding window for encoder D.

Referring to FIG. 15, encoder D encodes the data from the encoding window of FIG. 11 by placing $a_0$ on $C_3$. However, since the data in $C_3$ is black (1) the current line and the previous line have to be normalized. Encoder D finds a a color change on the current line data on $C_4$ and a color change on the previous line on $P_7$ and since $b_1$ is on $P_7$, the code is a vertical code ($V_{L3}$).

Since encoder A has encoded 3 bits, the result from encoders B and C will be ignored. However, the result from encoder D is needed. In this example, the result from encoder A along with the result from encoder D will be sent out.

The result from encoder A could be a vertical code, a pass code or a part of the horizontal code. The result from encoder B could be a vertical code, a pass code or a horizontal code which has three or less bits. The result from encoder C could be a vertical code, a pass code or a short horizontal code which has two or less bits. The result from encoder D could be a vertical code or a short horizontal code which has only one bit. The result from encoder D can not be a pass code since a pass code needs a minimum of two bits.

Referring to FIG. 16, there is shown 16 different conditions that can occur between the encoders. For example, the first condition shows that the Encoder A finds no color change in any of the four bits. Zero on the table represents the condition that there is no code found. As another example, condition 2 shows that Encoder A encodes all four bits. This means that the first color change is on the last bit $C_4$. Condition 3 shows that Encoder A encodes 3 bits, but encoder D finds no code. In which case, the unencoded bit from encoder D will be sent to LH code generator 40 (FIG. 1) to be stored and the result from encoder A will be sent to PVSH code generator 36 (FIG. 1). As yet another example, condition 8 shows a condition in which encoder A encodes 2 bits. As a result, the result from encoder C will be needed. However, encoder C has encoded only one bit. Therefore, the result from encoder D is also needed. In this condition 8, the result form encoder A, C and D will be sent out.

It should be noted that when it is mentioned that there is no code found (shown as 0 on the table of FIG. 15), it means that there is no change of color in the data stream. When there is no change of color, it means that the data is a part of a code which will terminate at the following clock cycle. Therefore, the following bits after $C_4$, which will be available in the next clock cycle, are needed in order to encode the bits from the current clock cycle. It should be noted that a code, which its data is partially in the encoding window of one clock cycle and partially in the encoding window of the following clock cycle, can be a pass code, a vertical code, a short horizontal code or a long horizontal code.

It should also be noted that the miss and match block 22 is the implementation of the table shown in FIG. 16.

Referring back to FIG. 1, the Miss and match block 22, observes the number of bits encoded in each encoder and selects only the output of encoder A or the output of encoder A in combination with the output of one or two or three of the encoders B, C or D. If encoder A encodes 4 bits, the result from encoder B, C and D will be ignored. If encoder A encodes 3 bits, the next $a_0$ position will be three bits away from the current $a_0$. Therefore, the result from encoder D will be combined with result from the encoder A since $a_0$ of encoder D which is at $C_3$ (FIG. 10) is three bits away from the $a_0$ of encoder A which is at $C_0$ (FIG. 7). The encoder D provides the one bit necessary to be added to the three bits from the encoder A to ensure four bits of data being encoded in one clock cycle. For the extreme case when each encoder encodes only one bit, the result from all four encoders are integrated together.

It should be noted that the miss and match block 22 selects the intermediate code along with their colors.

Referring to FIG. 1, the miss and match block sends the outputs of encoders A, B, C and D via line 38 along with their colors color$_1$, color$_2$, color$_3$ and color$_4$ via line 39 to the short code decoder 36. However, it should be noted that the miss and match block can send the output of encoder B, C and D on icode$_2$ and color$_2$, the output of encoders C and D on icode$_3$ and color$_3$ and only the output of the encoder D on icode$_4$ and color$_4$. For example, if encoder A has used 2 bits of data, then the result from encoder A should be combined with the result from encoder C or encoders C and D. In this case, the result from encoder A will be sent on icode$_1$ and its color on color$_1$ and the result from encoder C will be sent on icode$_2$ and its color on color$_2$ and depending on if the result from encoder D is needed, it will be sent on icode$_3$ and its color on color$_3$.

As and alternative example, if encoder A uses 3 bits of data, then the result from encoder A should be combined with the result from encoder D. In this case, the result from encoder A will be sent on icode$_1$ and the result form encoder D will be sent on icode$_2$.

It should be noted that if encoder A or one of the encoders B, C and D does not find a color change, the number of unencoded bits have to be stored in a register in LH code generator 40 in order to be combined with the following bits. The number of unencoded bits will be sent from the miss and match block 22 to the LH code generator 40 via INTH 42.

At each clock cycle, if any one of the encoders A, B, C and D does not find a color change, it means that the end of that code is in one of the following clock cycles. In the case that one of the encoders B, C and D does not find a color change, the intermediate code or the intermediate codes from the encoder or encoders prior to the encoder that could not find a color change will be sent to PVSH code generator 36 and in the same clock cycle, PVSH code generator 36 converts the intermediate codes each into a code while the unencoded bits will be stored in LH code generator 40. If encoder A does not find a color change, then all the unencoded bits ($C_1$-$C_4$) will be stored in LH code generator 40 and the PVSH code generator 36 will be inactivated.

On the following clock cycle, the code generator 40 combines the stored number of unencoded bits from a previous clock cycle with the number of bits from of the current clock cycle and if in the four bits of the current clock cycle a color change is not detected, it means that the end of the code is in one of the following clock cycles. In this case, the LH code generator 40 has to store the cumulative number of unencoded bits from the previous clock cycle to the number of unencoded bits from the current clock cycle. The process of storing the cumulative number of unencoded bits and combining them with the following bits and storing the new combination has to be continued until the end of the code is detected.

Once the end of a code is detected, if the code happens to be a pass code or a vertical code, the number of count in the count register 80 will be discarded since a pass code and a vertical code can be defined by a code and the data on the previous line without having the actual count for the number of bits. However, if the code is a long Horizontal code, the count from the LH generator 40 has to be used for the count of the long horizontal code.

It should be noted that once the end of a code is detected and it happens to be a pass code or a vertical code, then the miss and match block 22 will send an intermediate pass code or an intermediate vertical code respectively as $icode_1$ to PVSH code generator 36 and PVSH code generator 36 generates a pass code.

Figure 17:
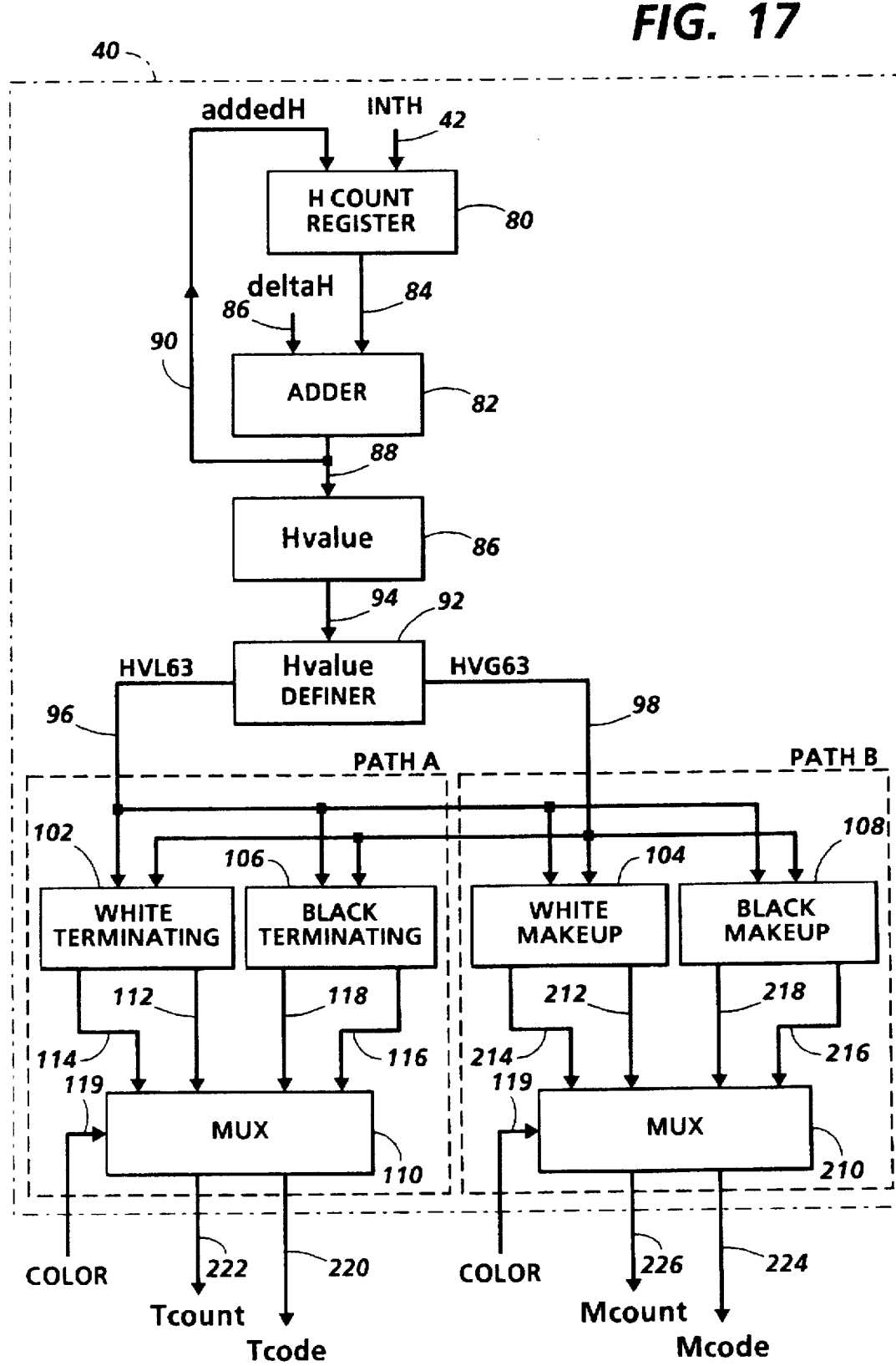
FIG. 17 shows a detailed block diagram of the LH code generator block of FIG. 1.

Referring to FIG. 17, there is shown the LH generator block 40. Every time there is an undetected code in the encoding window, the number of the unencoded bits INTH 42 will be stored in the H count register 80. The output of H count register 80 is sent to Adder 82 via line 84. The adder 82 also receives a deltaH (the number of encoded bits) via line 86 which comes from the state machine 24. On the next cycle, if a code is found, the adder 82 will add deltaH (the number of encoded bits of the current clock cycle) to the number from the H counter register 80 in order to generate an H value (length of the long horizontal code) which will be sent to Hvalue register 86 via line 88 to be stored in the Hvalue register 86. It should be noted that the Hvalue is defined as the length of the long horizontal code since it will be used only if the code is a long horizontal code. Once the end of a code is found, at the start of the following clock cycle, the H count register 80 will be reset and if there are unencoded bits on that clock cycle, the H count register 80 will store the INTH 42 (unencoded bits) from the miss and match block 22.

However, if on the following clock cycle there is no code detected, the adder 82 will add a delatH equal to 4 to the number from the H count register 80. In this case, the H value will not be available to Hvalue register 86. Therefore, the output of the adder 82 will not be stored in the Hvalue register. Instead, the output of the adder 82 will be sent to H count register 80 via addedH 90 to be stored in the H count register 80. The Hvalue from the Hvalue register 86 will not be used until the end of the code is detected.

In summary, if no code is generated on a particular clock cycle, on the next clock cycle, the H count register 80 will store a new value delivered by addedH 90. However, if a code is generated on a particular clock cycle, on the next clock cycle, the INTH will be stored in the Hcount register 80 and if there are no unencoded bits, then INTH will be 0 which will set the Hcount register 80 to zero.

If in one clock cycle, unencoded bits are stored, then on the following clock cycle, the following bits can have one of the conditions shown on FIG. 18. Referring to FIG. 18, there are shown five different conditions on the bits following the unencoded bits from the previous clock cycle along with deltaH for each condition. In FIG. 18, C represents a color change and N represents no color change and X is don't care (ignore). As it can be observed, in condition 1, since the color change is on bit $C_1$, only one bit is encoded and therefore deltaH is 1. In condition 2, since the color change is on bit $C_2$, two bits are encoded and therefore deltaH is 2. In condition 3, since the color change is on bit $C_3$, three bits are encoded and therefore deltaH is 3. In condition 4, since the color change is on bit $C_4$, four bits are encoded and therefore deltaH is 4. However, in condition 4 there is no color change, but since all four bits are considered in the encoding process, deltaH is 4.

. Referring back to FIG. 17, it should be noted that for the first cycle, −1 will be loaded to the H counter register 80 since the position of $P_0$ is an imaginary position which is one position before the first position to compensate for the extra bit generated by the imaginary position of $a_0$.

Once the end of a code is detected, if it happens to be a long horizontal code, then the H value form the Hvalue register 86 will be used to generate a long horizontal code. The Hvalue register 86 sends the Hvalue to Hvalue definer 92 via line 94. Hvalue definer 92 will determine if the Hvalue is less than or equal to 63 in which case it sends out an enabling signal HVL63 to both path a and path b via line 96. If H value definer 92 determines that H value is more than 63, then it will send an enabling signal HVG63 to both path a and path b via line 98.

It should be noted that once the end of a code is detected, if the code happens to be a pass code or a vertical code, the Hvalue will not be available to the Hvalue register 86.

For a long horizontal code, the Hvalue will be divided into two parts. The 6 least significant bits (bits 0 to 5) will be sent to path a and the remaining bits (bit 6 and above) will be sent to path b. Path a which contains two look up tables 102 and 106 for terminating codes will be used for the first 63 bits and path b which contains two look up tables 104 and 108 for makeup codes will be used for the remaining value of Hvalue above 63.

Each path has a white look up table 102 (path a) and 104 (path b) and a black look up table 106 (path a) and 108 (path b). Therefore, in each path two codes; one for the black and one for the white will be generated. However, depending on the color of each code, the appropriate code will be selected. Each table sends out a code and its count. In path a MUX (multiplexer) 110 selects the white code 112 and white code count 114 or the black code 116 and black code count 118. Color 119 which comes from the miss and match block 22 controls the selection of the MUX 110. In path b MUX 210 selects the white code 212 and white code count 214 or the black code 216 and black code count 218. Color 119 also controls the selection of the MUX 210. Therefore, the MUXs 110 and 210 each provide a code and count for that code. MUX 110 sends out a Tcode as a terminating code via line 220 and Tcount (terminating code count) via line 222 to code merge block 46 and MUX 210 sends out a Mcode as a makeup code via line 224 and Mcount (makeup code count) via line 226 to code merge block 46.

If the Hvalue is equal or less than 63, only path a will be activated by HVL63 96. However, if the Hvalue is more than 63, then both path a and path b will be activated by HVG63 98.

It should be noted that if the Hvalue is more than 2560, a 2560 code will be sent out and 2560 will be subtracted from the Hvalue and if the Hvalue is still greater than 2560, another 2560 code will be sent out. However, if after the subtraction, the the Hvalue is less than 2560 a proper code will be sent out.

Referring back to FIG. 1, the intermediate codes from encoders A, B, C and D will be sent to PVSH code generator 36. Block 36 is called PVSH code generator since it converts the intermediate codes for the pass codes, vertical codes and short horizontal codes.

Figure 19:
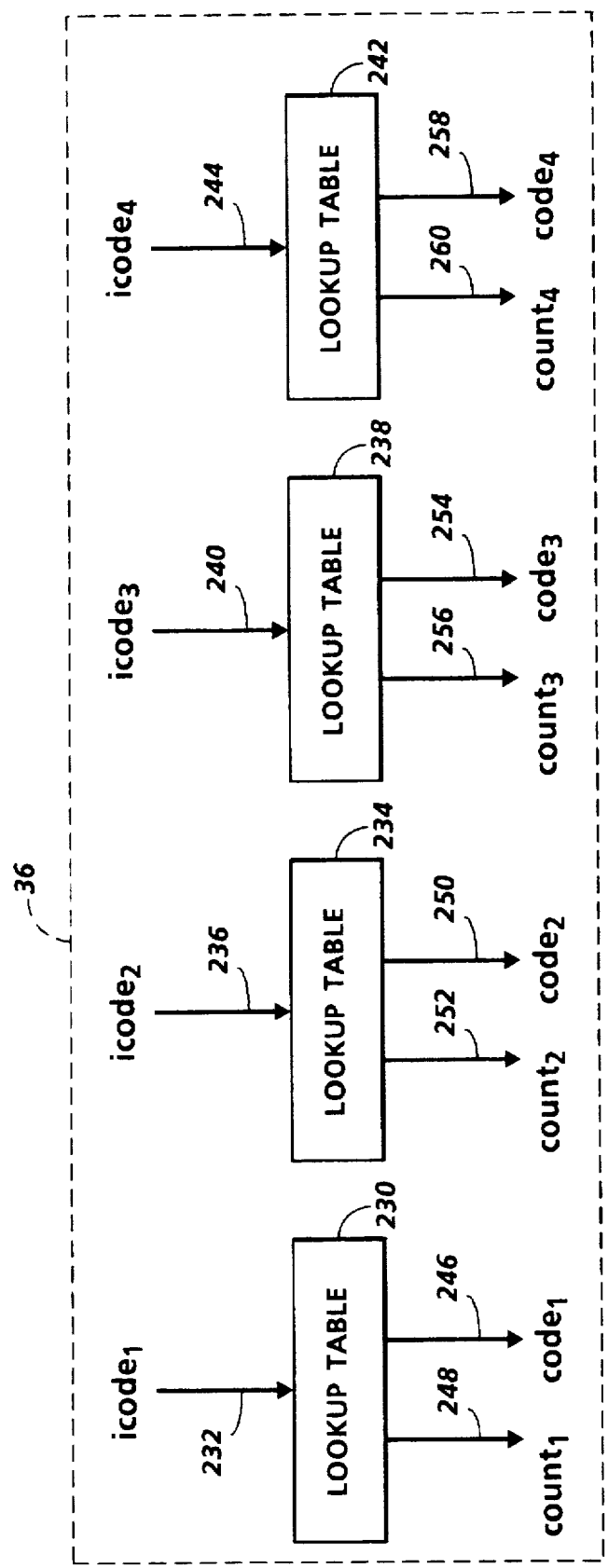
FIG. 19 shows a block diagram of the PVSH code generator of FIG. 1.

Referring to FIG. 19, there is shown a block diagram of the PVSH code generator 36. In the PVSH code generator 36, there is one look up table for each individual encoder. Look up table 230 receives the $icode_1$ via line 232, look up table 234 receives the $icode_2$ via line 236, look up table 238 receives the $icode_3$ via line 240 and look up table 242 receives the $icode_4$ via line 244. The $icode_1$, $icode_2$, $icode_3$ and $icode_4$ are sent to the PVSH code generator 36 from the miss and match block 22. Each look up table contains the actual codes for pass code, vertical codes and short horizontal codes. Each look up table sends out the actual code with count for the number of bits of that code. Look up table 230 sends out $code_1$ via line 246 and its count via line 248, look up table 234 sends out $code_2$ via line 250 and its count via line 252, look up table 238 sends out $code_3$ via line 254 and its count via line 256 and look up table 242 sends out $code_4$ via line 258 and its count via line 260. The codes and the counts from the PVSH code generator 36 will be sent to the code merge block 46 (FIG. 1).

Referring back to FIG. 1, the results from the PVSH code generator 36 and the LH code generator 40 will be sent to the code merge block 46.

Figure 20:
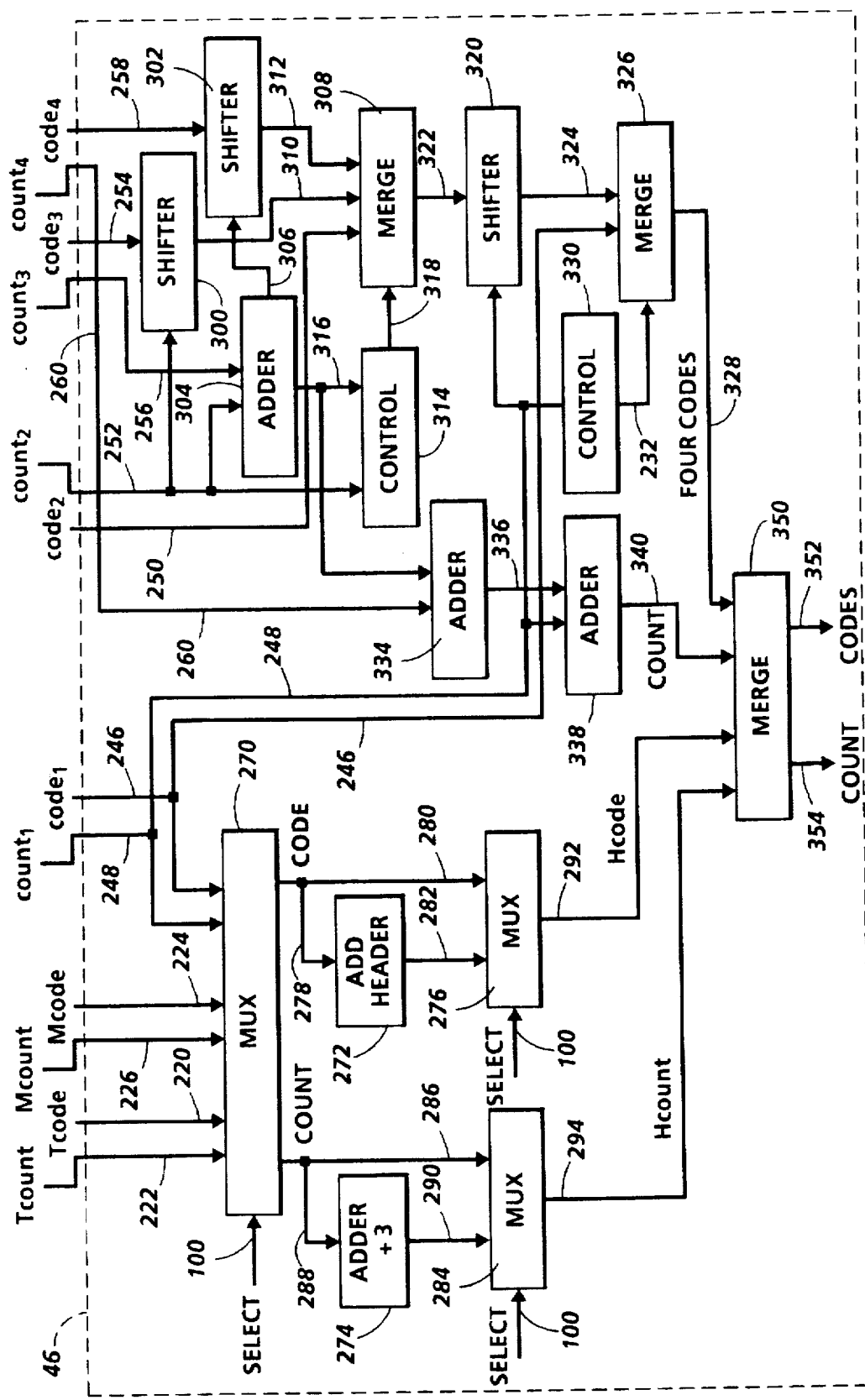
FIG. 20 shows a block diagram of a code merge block.

Referring to FIG. 20, there is shown a block diagram of a code merge block 46. The code merge block 46, receives four codes with their counts from the PVSH code generator 36 and two codes with their counts from the LH code generator 40. MUX 270 will select either $code_1$ 246 and $count_1$ 248 with its count from the PVSH code generator 36, Tcode 220 and Tcount 222 or Mcode 224 and Mcount 226 from the LH code generator 40. Select 100 which is sent from the state machine 24 controls the selection of the MUX 270. If select 100 is 0, then $code_1$ 246 and its count 248 will be selected. However, if select 100 is 1 then depending on if a terminating code is needed, Tcode 220 and Tcount 222 will be selected and if a makeup code is needed, Mcode 224 and Mcount 226 will be selected.

Furthermore, if the Tcode 220 or Mcode 224 with their counts 222 and 226 are selected, a heading of 001 which is the indicator of a horizontal code has to be added to the beginning of the codes and therefore, a number 3 representing the number of bits in the header (001) should be added to the count of the horizontal code. This is accomplished by the adder block 272 and the Add header block 274. The selected code from MUX 270 will be sent to both the Add header block 272 and MUX 276 via lines 278 and 280 respectively. Add header block 272 adds the header to the selected code. The result from the Add header block 272 will also be sent to MUX 276 via line 282. In the same manner, the selected count from MUX 270 will be sent to both MUX 284 and Adder block 274 via lines 286 and 288. Adder block 274 will add 3 to the count and the result will be sent to MUX 284 via line 290. Select 100 will control the selections of MUX 276 and MUX 284. If select is 0, then MUX 276 will select the code from MUX 270 and MUX 284 will select the count from MUX 270. However, if select=1, then MUX 276 will select the output 282 of the Add Header 272 and MUX 284 will select the output 290 of Adder 274.

The output 292 of the MUX 272 is either $code_1$ or long horizontal code and the output 294 of the MUX 284 is the either count for $code_1$ or count for long horizontal code respectively.

The code merge block 46, shifts $code_2$, $code_3$ and $code_4$ in order to place them one after the other. $Code_3$ will be shifted by Shifter 300. Shifter 300 shifts $code_3$ by the number of the bits in $code_2$. In other words, Shifter 300 receives $count_2$ via line 252 and $code_3$ via line 254 and shifts $code_3$ by the number on $count_2$. Shifting $code_3$ by $count_2$ ensures that when the codes are placed serially, they don't overwrite each other. Then $code_4$ will be shifted by Shifter 302. Shifter 302 shifts $code_4$ by a number equal to the count of $code_2$ and $code_3$. Adder 304 receives both $count_2$ and $count_3$ via lines 252 and 256 respectively and adds them together and delivers the result $count_{23}$ to Shifter 302 via line 306. Shifter 302 uses $count_{23}$ which is the addition of $Count_2$ and $count_3$ to shift $code_4$. Again, this is done to ensure that when the codes are placed serially they precisely follow each other.

Merge block 308, receives $code_2$, shifted $code_3$ and shifted $code_4$ via lines 250, 310 and 312 respectively and places them serially. Control block 314 receives $count_2$ 252 and the result 316 of Adder 304 and generates a signal 318 to control the Merge block 308. Control block 314 generates a mask to select $code_2$, $code_3$ or $code_4$ or a combination of them depending on the number of bits of $code_1$.

Finally, Shifter 320 shifts the result 322 of the Merge block 308 by the number of the bits on $code_1$ ($count_1$ 248). The result 324 of the Shifter 320 will be sent to the Merge block 326. Merge block 326, which also receives $code_1$ 246, places $code_1$ and result 324 of shifter 320 serially. If all of $code_2$, $code_3$ and $code_4$ are used, the result 324 of shifter 320 will be $code_2$, $code_3$ and $code_4$ one after the other. In this case the result 328 of Merge block 326, will be $code_1$, $code_2$, $code_3$ and $code_4$. Therefore, the result of Merge 326 will always be $code_1$ with any combination of $code_2$, $code_3$ and $code_4$. Control block 330 receives $count_1$ 248 to generate a control signal 232 for Merge block 326. Control block 330 generates a mask to select $code_1$ alone or $code_1$ with a combination of $code_2$, $code_3$ and $code_4$.

Adder 334, receives $count_{23}$ 316 and $count_4$ 260 and adds them together to generate $count_{234}$ 336. Adder 338 receives $count_{234}$ 336 and $count_1$ 248 and adds them together to provide the count 340 for all the codes.

When the end of a code is detected, along with that code, a combination of $code_2$, $code_3$ and $code_4$ can also be sent out depending on if that code ends on the $C_1$, $C_2$ or $C_3$ of the encoding window.

Figure 21:
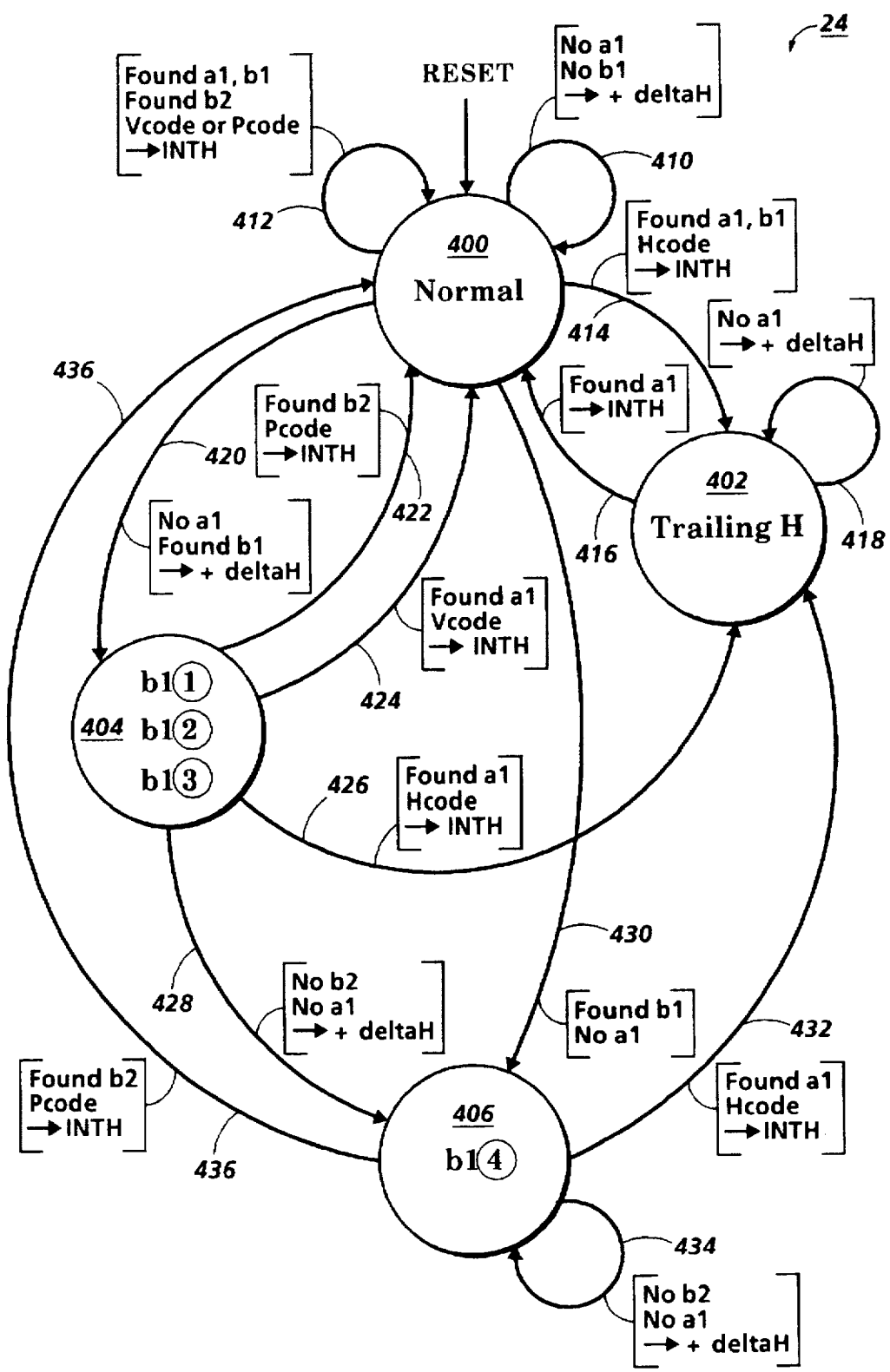
FIG. 21 shows different states of the state machine of FIG. 1.

Referring to FIG. 21, there is shown the state machine 24 which serves to pass the encoding status from current clock cycle to the next clock cycle. State machine 24 is designed for three states: normal state 400, trailing state 402 in which the trailing horizontal code of the two dimensional coding is expected and b1 states 404 and 406 in which the change of color on the previous line is detected, but no change of color is detected on the current line.

The state machine 24 is reset to normal state 400 at the beginning of a scan line. When condition 410 occurs, it means that there is no code found, as in case 5 of FIG. 15. In this condition 410 the state machine stays at the normal state 400 and a deltaH equal to 4 will be added to the adder 82 of the LH code generator 40 (FIG. 16). Condition 410 is shown as no $a_1$ no $b_1$. When condition 412 occurs, it means that there is a pass code, a vertical code or a pair of codes representing the leading code and trailing codes of a horizontal code. In this condition 412 the state machine 24 stays at the normal state 400 and the horizontal count register 80 (FIG. 16) receives INTH 42. At the same time, the output 88 of the adder 82 will be loaded into the Hvalue register 86. Condition 412 is shown as found $a_1$, $b_1$ or $b_2$ (vertical code or pass code).

When condition 414 occurs, it means only the leading code of a horizontal code is detected, the state of the state machine is changed to trailing state 402. Condition 414 is shown by found $a_1$ and $b_1$ therefore there is a H (horizontal) code. Once the state machine enters into this state 402, it will stay in this state until the end of the horizontal code is detected and then it will return to normal state 400. The condition shown by 416 shows that $a_1$ is found meaning that the end of horizontal code is found and the state machine returns to normal state 400. In this state 402, if condition 418 happens, it means that no code is found (no $a_1$). Therefore, a deltaH equal to 4 will be added to the adder 82 of the LH code generator 40 (FIG. 16).

State $b_1$, which is shown as two states $b_1(4)$ 406 and $b_1(123)$ 404, is a state in which the change of color ($b_1$) on previous line is detected, but the change of color on the current line ($a_1$) is not found. The position of $b_1$ is important since it can determine whether the code at the next cycle is a $V_{R1}$, $V_{R2}$, $V_{R3}$, a pass code or a horizontal code. State $b_1$ (1) is defined as $b_1$ at position $P_4$ in which the code at the next cycle could a $V_{R2}$, $V_{R3}$, a pass code or a horizontal code. State $b_1$ (2) is defined as $b_1$ at position $P_3$ in which the code at the next cycle could be $V_{R3}$, a pass code or a horizontal code. State $b_1$ (3) is defined as $b_1$ at position $P_2$ in which the code at the next cycle could be a pass code, a vertical code or a horizontal code. State $b_1$ (4), which is defined as $b_1$ at position $P_1$, has ruled out all $V_R$ codes and it can only be either a pass code, or a horizontal code.

In normal state 400, if condition 420 occurs, it means that $b_1$ has been found and $b_1$ is on either $P_2$, $P_3$ or $P_4$, but $a_1$ is not found. This condition 420, takes the state machine 24 into $b_1$ (123) state 404. Once the state machine enter into state 404, if condition 420 occurs, it means $b_2$ is found and therefore there is a pass code. This condition 420 returns the state machine to normal state 400. At the same time, the horizontal count register 80 (FIG. 16) receives INTH 42.

In $b_1$ (123) state 404, if condition 424 occurs, it means that $a_1$ has been found and $a_1$ is not more than 3 bits away from $b_1$ and therefore there is a vertical code. This condition 424 returns the state machine to normal state 400. At the same time the horizontal count register 80 (FIG. 16) receives INTH 42.

In $b_1$ (123) state 404, if condition 426 occurs, it means that $a_1$ has been found and $a_1$ is more than 3 bits away from $b_1$ and therefore there is a horizontal code. This condition 426 takes the state machine to trailing state 402. At the same time, the horizontal count register 80 (FIG. 16) receives INTH 42.

In b1 (123) state 404, if condition 428 occurs, it means that no $a_1$ and no $b_2$ has been found and therefore the state machine moves to $b_1(4)$ state 406. At the same time, a deltaH equal to 4 will be added to the adder 82 (FIG. 16).

In normal state 400, if condition 430 occurs, it means that $b_1$ has been found and $b_1$ is on either $P_1$, but $a_1$ is not found. This condition 430, takes the state machine 24 into $b_1$ (4) state 402. Once the state machine enter into $b_1$ (4) state 402, if condition 432 occurs, it means $a_1$ is found and since $a_1$ is more than 3 bits away from $b_1$, there exists a horizontal code. This condition 432 takes the state machine 24 to trailing state 402. At the same time the horizontal count register 80 (FIG. 16) receives INTH 42.

In $b_1$ (4) state 406, if condition 434 occurs, it means that no $a_1$ and no $b_2$ has been found and therefore the state machine stays in $b_1$ (4) state 406. At the same time, a deltaH equal to 4 will be added to adder 82 of the LH code generator 40 (FIG. 16).

In b1 (4) state 406 , if condition 436 occurs, it means that $b_1$ has been found and therefore the state machine returns to normal state normal. At the same time, the horizontal count register 80 (FIG. 16) receives INTH 42.

The disclosed encoder of this invention is capable of encoding with both one dimensional and two dimensional CCITT algorithms and also with IBMMR and TIFF algorithms.

What is claimed is:

1. An apparatus for encoding uncompressed image data comprising:

converting means for receiving a given number of bits of uncompressed data within a given clock cycle and generating one intermediate code if the given number of bits can be represented by one code or in parallel generating a plurality of intermediate codes if the given number of bits can be represented by a plurality of codes or keeping the given number of bits of uncompressed data unaltered if the given number of bits of uncompressed data can not be represented by a code.

a first code generator operably connected to said converting means;

within the same clock cycle, said first code generator receiving said one intermediate code if the given number of bits of uncompressed data can be represented by a code and converting said one intermediate code into a code or receiving said plurality of intermediate codes if the given number of bits of uncompressed data can be represented by a plurality of codes and converting said plurality of intermediate codes each into a code;

a second code generator operably connected to said converting means;

within the same clock cycle, said second code generator receiving the unaltered given number of bits of uncompressed data if they can not be represented by a code and storing them;

within a clock cycle, said second code generator adding the stored number of bits from a previous clock cycle to an unaltered number of bits of uncompressed data of the current clock cycle and storing the cumulative number of bits if the cumulative number of bits can not be represented by a code and repeating the storing process within each clock cycle until the stored number of bits from a previous clock cycle along with the unaltered number of bits of uncompressed data of the current clock cycle can be represented by a code;

within a clock cycle in which the stored number of bits from a previous clock cycle along with the unaltered number of bits of uncompressed data of the current clock cycle can be represented by a code, said second code generator converting the cumulative number of bits into a horizontal code, if the cumulative number of bits can be represented by a horizontal code and discarding them if the cumulative number of bits can be represented by a pass code or a vertical code; and said first code generator generating a pass code or a vertical code if the cumulative number of bits can be represented by a pass code or a vertical code.

2. An apparatus for encoding uncompressed image data comprising:

converting means for receiving a given number of bits of uncompressed data within a given clock cycle and generating one intermediate code if the given number of bits can be represented by one code or in parallel generating a plurality of intermediate codes if the given number of bits can be represented by a plurality of codes or keeping the given number of bits of uncompressed data unaltered if the given number of bits of uncompressed data can not be represented by a code or generating an intermediate code or a plurality of intermediate codes for the bits of data from the given number of bits which can be represented by an intermediate code or by plurality of intermediate codes and keeping the residual number of bits of the given number of bits of uncompressed data unaltered which can not be represented by a code;

a first code generator operably connected to said converting means;

within the same clock cycle, said first code generator receiving said one intermediate code if the given number of bits of uncompressed data can be represented by a code and converting said one intermediate code into a code or receiving said plurality of intermediate codes if the given number of bits of uncompressed data can be represented by a plurality of codes and converting said plurality of intermediate codes each into a code;

a second code generator operably connected to said converting means;

within the same clock cycle, said second code generator receiving the unaltered number of bits of uncompressed data if they can not be represented by a code and storing them;

within a clock cycle, said second code generator adding the stored number of bits from a previous clock cycle to an unaltered number of bits of uncompressed data of the current clock cycle and storing the cumulative number of bits if the cumulative number of bits can not be represented by a code and repeating the storing process within each clock cycle until the stored number of bits from a previous clock cycle along with the unaltered number of bits of uncompressed data of the current clock cycle can be represented by a code;

within a clock cycle in which the stored number of bits from a previous clock cycle along with the unaltered number of bits of uncompressed data of the current clock cycle can be represented by a code, said second code generator converting the cumulative number of bits into a horizontal code, if the cumulative number of bits can be represented by a horizontal code and discarding them if the cumulative number of bits can be represented by a pass code or a vertical code; and said first code generator generating a pass code or a vertical code if the cumulative number of bits can be represented by a pass code or a vertical code.

3. The apparatus as recited in claim 2 further comprising means for concatenating said code or code generated by said first code generator.

4. The apparatus as recited in claim 2, wherein the given number bits of uncompressed data is four bits.

5. The apparatus as recited in claim 2, wherein said plurality of intermediate codes is two intermediate codes.

6. The apparatus as recited in claim 2, wherein said plurality of intermediate codes is three intermediate codes.

7. The apparatus as recited in claim 2, wherein said plurality of intermediate codes is four intermediate codes.

8. A method for encoding uncompressed image data comprising:

a. receiving a given number of bits of uncompressed data within a given clock cycle and generating one intermediate code if the given number of bits can be represented by one code or in parallel generating a plurality of intermediate codes if the given number of bits can be represented by a plurality of codes or keeping the given number of bits of uncompressed data unaltered if the given number of bits of uncompressed data can not be represented by a code;

b. within the same clock cycle, converting said one intermediate code into a code if the given number of bits of uncompressed data can be represented by a code or converting said plurality of intermediate codes each into a code if the given number of bits of uncompressed data can be represented by a plurality of codes;

c. within the same clock cycle, storing the unaltered given number of bits of uncompressed data if they can not be represented by a code;

d. within a clock cycle, adding the stored number of bits from a previous clock cycle to an unaltered number of bits of uncompressed data of the current clock cycle and storing the cumulative number of bits if the cumulative number of bits can not be represented by a code and repeating the storing process within each clock cycle until the stored number of bits from a previous clock cycle along with the unaltered number of bits of uncompressed data of the current clock cycle can be represented by a code;

e. within a clock cycle in which the stored number of bits from a previous clock cycle along with the unaltered number of bits of uncompressed data of the current clock cycle can be represented by a code, converting the cumulative number of bits into a horizontal code, if the cumulative number of bits can be represented by a horizontal code and discarding them if the cumulative number of bits can be represented by a pass code or a vertical code; and f. generating a pass code or a vertical code if the cumulative number of bits can be represented by a pass code or a vertical code.

9. A method for encoding uncompressed image data comprising:

a. receiving a given number of bits of uncompressed data within a given clock cycle and generating one intermediate code if the given number of bits can be represented by one code or in parallel generating a plurality of intermediate codes if the given number of bits can be represented by a plurality of codes or keeping the given number of bits of uncompressed data unaltered if the given number of bits of uncompressed data can not be represented by a code or generating an intermediate code or a plurality of intermediate codes for the bits of data from the given number of bits which can be represented by an intermediate code or by plurality of intermediate codes and keeping the residual number of bits of the given number of bits of uncompressed data unaltered which can not be represented by a code;

b. within the same clock cycle, converting said one intermediate code into a code if the given number of bits of uncompressed data can be represented by a code or converting said plurality of intermediate codes each into a code if the given number of bits of uncompressed data can be represented by a plurality of codes;

c. within the same clock cycle, storing the unaltered number of bits of uncompressed data if they can not be represented by a code;

d. within a clock cycle, adding the stored number of bits from a previous clock cycle to an unaltered number of bits of uncompressed data of the current clock cycle and storing the cumulative number of bits if the cumulative number of bits can not be represented by a code and repeating the storing process within each clock cycle until the stored number of bits from a previous clock cycle along with the unaltered number of bits of uncompressed data of the current clock cycle can be represented by a code;

e. within a clock cycle in which the stored number of bits from a previous clock cycle along with the unaltered number of bits of uncompressed data of the current clock cycle can be represented by a code, converting the cumulative number of bits into a horizontal code, if the cumulative number of bits can be represented by a horizontal code and generating a pass code and discarding the cumulative number of bits if the cumulative number of bits can be represented by a pass code and generating a vertical code and discarding the cumulative number of bits if the cumulative number of bits can be represented by a vertical code.

10. The method as recited in claim 9 further comprising the step of concatenating said code or code generated by step b.

11. The method as recited in claim 9, wherein the given number bits of uncompressed data is four bits.

12. The method as recited in claim 9, wherein said plurality of intermediate codes is two intermediate codes.

13. The method as recited in claim 9, wherein said plurality of intermediate codes is three intermediate codes.

14. The method as recited in claim 9, wherein said plurality of intermediate codes is four intermediate codes.

* * * * *